No. 765,420. PATENTED JULY 19, 1904.
F. C. ESMONIN.
FLEA TRAP.
APPLICATION FILED FEB. 1, 1904.
NO MODEL.

WITNESSES
H. B. Bertrand
M. Louise Bellman

INVENTOR
Francois Clement Esmonin
BY
Chas. E. Sackett, ATTORNEY

No. 765,420. Patented July 19, 1904.

UNITED STATES PATENT OFFICE.

FRANÇOIS CLEMENT ESMONIN, OF FALL RIVER, MASSACHUSETTS.

FLEA-TRAP.

SPECIFICATION forming part of Letters Patent No. 765,420, dated July 19, 1904.

Application filed February 1, 1904. Serial No. 191,640. (No model.)

*To all whom it may concern:*

Be it known that I, FRANÇOIS CLEMENT ESMONIN, a citizen of the United States, residing at Fall River, in the county of Bristol and State of Massachusetts, have invented a new and useful Improvement in Flea-Traps, of which the following is a specification.

This invention relates to an improvement in insect-traps in which a light is used to attract them and a sticky substance employed to trap them when they alight in the vicinity of the light.

It consists in its easily-connected and reversible parts, whereby the apparatus is conveniently handled and may be carried or placed beneath articles of furniture without danger from fire. I attain these objects by the mechanism illustrated in the accompanying drawings, in which—

Figure 1:
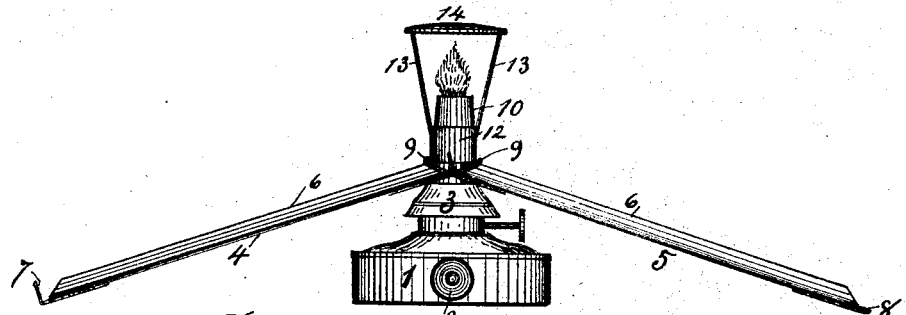
Figure 2:
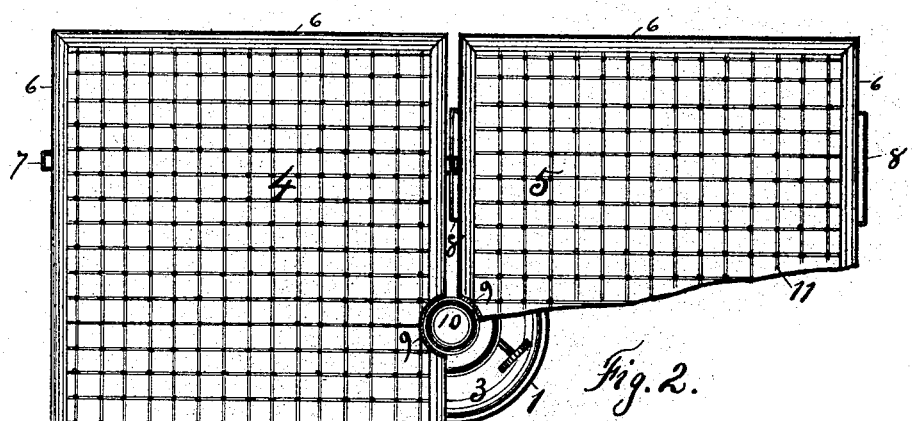
Figure 3:
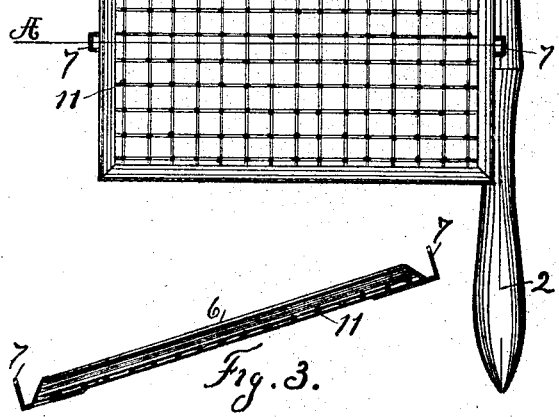
Figures 4, 5:
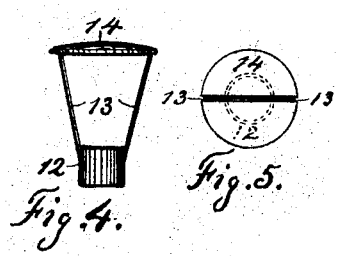

Figure 1 is a side elevation of the complete apparatus as it may be carried about. Fig. 2 is a plan view of the same, a section being removed to show the lamp beneath the inclined plates. Fig. 3 is a cross-section through an inclined plate on line A. Fig. 4 is a removable flame-screen; Fig. 5, a plan view of the same.

In all the figures like numerals relate to like parts.

1 is a tray, preferably made of tin, having a supporting-handle 2 adapted to hold a lamp 3 in position within the tray and retain any oil leakage or overflow.

4 and 5 are companion inclined plates, made, preferably, of tin, having upturned edges 6, soldered at corners, forming tight gutters around the edge of said plates. Plate 4 is provided with a series of upturned hooks 7 on both of its longitudinal edges. Plate 5 is provided with a series of loops 8 on both of its corresponding edges, in which the hooks are easily slipped and retained. Both hooks and loops are preferably made of wire soldered to the plates. Each plate is provided with a central corresponding half-orifice 9, through which the wick-tube 10 of the lamp protrudes. The plates are further provided with a lattice of wire 11, soldered to them within the gutters. When in use, this wire lattice is spread over with a sticky substance formed of a mixture of rosin and castor-oil melted together or other suitable preparation for entangling the legs or wings of insects that may alight thereon and walk toward the light, by which they are attracted. The object of the wire lattice is to prevent the sticky material when softened by the heat of the lamp or warm weather from running down the plates. The object of the gutters is to retain such part of the substance as may flow down, and the object of the hooks and loops on both edges of the plates is that the plates may be reversed and rehooked at any time and the retained substance made to flow in the opposite direction. Sticky fly-paper may be cut to fit within the gutters and laid upon the plates to produce the same entangling effect.

A removable screen is arranged over the flame, formed of a tube 12, which is dropped over the wick-tube, having side wires 13, which support a screen-plate 14, which also acts as a reflector.

When in use, the inclined plates are arranged about the wick-tube of the lamp and being locked together by their hooks and loops are supported by the body of the lamp and handled tray. The apparatus may be placed on the floor of a sleeping-apartment beneath a bed or other article of furniture.

The wick of the lamp is lighted and turned up about one-quarter of an inch. The light being reflected upon the inclined plates attracts the insects, which jump or alight upon it, and imprisons them until dead.

Having thus described my invention, what I claim, and desire to secure by Letters Patent, is—

1. In a flea-trap the combination of a handled tray, a lamp supported by said tray, inclined plates supported by said lamp, and a screen covering the flame of said lamp, and reflecting its light upon the plates substantially as described and shown.

2. In a flea-trap the combination with a supported lamp, of inclined plates having a central half-orifice in each through which the wick-tube of said lamp protrudes, and means for securing them about said tube, substantially as described and shown.

3. In a flea-trap combining a lamp and inclined plates arranged about the wick-tube of said lamp, the combination of upturned edges around said plates, closed at the corners, forming gutters, and a wire lattice secured to the floor of said plates, substantially as described and shown.

4. In a flea-trap combining a tray, a lamp, inclined plates supported by said lamp arranged with guttered edges, the combination with said gutters of hooks arranged upon two opposite sides of one of the plates, and corresponding loops arranged upon two opposite sides of the companion plate, whereby they are secured about the wick-tube of the lamp, and made reversible by the duplicate hooks and loops substantially as described and shown.

5. In a flea-trap combining a tray, a lamp, and inclined plates supported by the wick-tube of the lamp protruding through them, the combination with said wick-tube of a removable flame-screen arranged above said plates reflecting the light upon them substantially as described and shown.

FRANÇOIS CLEMENT ESMONIN.

Witnesses:
WILFRED BELLIVEAU,
ADOLPHE BLAIR.